Patented Nov. 17, 1936

2,060,829

UNITED STATES PATENT OFFICE 2,060,829

ESTERS OF DIHYDRONAPHTHALENE-DI-CARBOXYLIC ACIDS AND METHOD FOR MAKING THE SAME

Norman D. Scott, Niagara Falls, N. Y., assignor to E. I. du Pont de Nemours & Company, Wilmington, Del., a corporation of Delaware No Drawing. Application September 13, 1934, Serial No. 743,843

13 Claims. (Cl. 260—99.40)

This invention relates to new compositions of matter, more particularly to esters of dihydronaphthalene dicarboxylic acids, and specifically to esters of dihydronaphthalenedicarboxylic acids, wherein a hydrogen atom and a carboxyl group are attached to each of two carbon atoms.

Carboxylic acids of the bi-nuclear series are difficult of preparation but afford various prospects of utility. The preparation of esters of these acids is therefore a problem of considerable practical importance.

An object of this invention is the preparation of esters of dihydronaphthalenedicarboxylic acids. Other objects will appear hereinafter.

These objects are accomplished by the following invention wherein a dihydronaphthalenedicarboxylic acid containing a hydrogen atom and a carboxyl group on each of two carbon atoms or an ester, anhydride, or chloride of said acid is treated with a monohydric alcohol, or the sodium salt of the acid is reacted with the halide of a monohydric alcohol and the resulting ester isolated.

In copending application Serial No. 638,524, filed Oct. 19, 1932, there are disclosed methods for the production of dihydronaphthalenedicarboxylic acids by the reaction of sodium with naphthalene followed by the addition of carbon dioxide. Acids produced in this manner are characterized by the fact that they contain two carbon atoms to each of which is attached a hydrogen atom and a carboxyl group. These acids or their anhydrides, chlorides, or simple esters may be reacted with monohydric alcohols as illustrated in the examples given below. An alternative method for the preparation of the esters of these acids is the reaction of alkyl chlorcarbonates with the compound formed by the addition of sodium to naphthalene in an appropriate medium.

The following examples are given to illustrate these methods of the preparation of dihydronaphthalenedicarboxylic acids and their esters:

Example 1

*Dihydronaphthalenedicarboxylic acids.*—The preparation of these acids is fully described in copending application Serial No. 638,524. The following is one procedure which gives satisfactory yields of these acids: One hundred twenty-eight grams of naphthalene are dissolved in 1000 cc. of dimethyl ether and cooled to —30° C. Fifty grams of sodium is then added in small pieces and the mixture is stirred vigorously. The sodium reacts with the naphthalene producing an intense green color which spreads thruout the whole solution. The mixture is cooled to —60° C. and a stream of carbon dioxide gas bubbled thru the solution at such a rate that the green color is discharged thru the main body of the solution but remains around the surface of the unreacted sodium. The addition of carbon dioxide is continued until all of the sodium is consumed. The dimethyl ether is allowed to evaporate and the mixture worked up to isolate the carboxylic acids produced. The product consists of 52% 1,4-dihydronaphthalene-1,4-dicarboxylic acid melting in the neighborhood of 200° C., and about 33% isomeric acids, mainly 1,2-dihydronaphthalene-1,2-dicarboxylic acid melting from 120° to 150° C.

These acids may be used in the preparation of esters according to the following examples:

Example 2

*Dibutyl dihydronaphthalenedicarboxylate.*—A mixture containing 220 g. 1,4-dihydronaphthalene-1,4-dicarboxylic acid, 220 g. butanol, 250 g. ethylene dichloride, and 2 g. sulfuric acid is heated to boiling in an apparatus designed to separate the water from the distillate and to return the ethylene dichloride to the reaction vessel. Distillation is continued until the theoretical amount of water has been removed and substantially all of the acid has been esterified. The product is washed with sodium carbonate solution to remove the unreacted acids and then with water. The resulting product is refined by heating to 130° C. at 50 mm. vacuum followed by steaming under the same conditions to remove all volatile material. The remaining product is treated with carbon and filtered. The resulting product is a pale amber colored oil.

Example 3

*Dimethoxyethyl dihydronaphthalenedicarboxylate.*—The mixture of acids disclosed in Example 1 is used in the preparation of this ester. A mixture containing 218 g. of the mixed acid of Example 1, 200 g. methoxyethanol, 300 g. ethylene dichloride, and 5 g. sulfuric acid is heated to boiling in the apparatus described in Example 2. The preparation and refining of the ester is completed as described in Example 2. The resulting product is an amber colored oil.

Example 4

*Dicyclohexyl dihydronaphthalenedicarboxylate.*—A mixture containing 220 g. 1,4-dihydronaphthalene-1,4-dicarboxylic acid, 250 g. cyclohexanol, 300 g. ethylene dichloride, and 4 g. sulfuric acid is heated to boiling in the apparatus described in Example 2. The preparation and refining of the ester is carried out as described in Example 2. The resulting product is a pale amber, very viscous oil.

Example 5

*Diethyl dihydronaphthalenedicarboxylate.*—One hundred twenty-eight grams naphthalene are dissolved in 1000 cc. dimethyl ether of ethylene glycol and cooled to approximately 0° C. Fortysix grams of sodium are added in small pieces with vigorous stirring. The solution turns green and the green color spreads thruout the whole solution. Two hundred seventeen grams of ethyl chlorocarbonate are added just fast enough to destroy the green color as fast as it is produced around the sodium. When the reaction is over, the salt is filtered off, the dimethyl ether of ethylene glycol is evaporated, most of the excess naphthalene is recovered by crystallization, and the remaining product is vacuum distilled. An additional small amount of naphthalene is recovered, and a product boiling from 170° to 180° C. at 7 mm. is obtained. This is diethyl dihydronaphthalenedicarboxylate and consists of a mixture of the 1,4 and 1,2 isomers.

*Example 6*

Dimethyl dihydronaphthalenedicarboxylate.— A mixture of the acid isomers (1,4-dihydronaphthalenedicarboxylic acid and 1,2-dihydronaphthalenedicarboxylic acid) was prepared by carboxylating the sodium-naphthalene addition compound and acidifying to convert the sodium salts to the free acids. The acid mixture (2680 g.) was dissolved in 2 liters of methanol and 60 g. of HCl was added. The mixture was refluxed four hours, 60 g. additional HCl was added and refluxing continued for seven hours longer. The products were recovered by vacuum distillation. The distillate, which comprised an impure mixture of the two isomeric methyl esters, boiled at 115° to 195° C. at 2 to 5 mm. pressure; the distillate weighed 1084 g.

*Example 7*

Dimethyl dihydronaphthalenedicarboxylate.— Crude sodium salts of the isomeric dihydronaphthalenedicarboxylic acids were prepared by carboxylating the sodium-naphthalene addition compound. To 528 g. of the salts, was added 700 g. of methyl chloride and 500 cc. of xylene. The mixture was heated in an autoclave for 15¼ hours at 85°–100° C. and a pressure of 400 to 500 lbs./sq. in. After filtration to remove unchanged salts, the liquid was distilled in vacuum to separate the methyl ester. The yield of crude product was 47% of the theoretical, based on the salts originally taken.

*Example 8*

Dimethyl dihydronaphthalenedicarboxylate.— About 2.2 kg. of the crude sodium salts of dihydronaphthalene dicarboxylic acids were mixed with 5.2 liters of methanol. HCl gas was passed into the mixture while cooling to maintain the temperature at about 0° C. until 1 kg. of HCl was absorbed. The mixture then was refluxed for about one hour on a steam bath. Water then was added and the crude ester was separated by gravity. The crude product was washed with dilute alkali, diluted with an equal volume of methanol, dried with anhydrous $Na_2CO_3$ and the dry solution distilled to remove the methanol. The methanol-free material then was distilled under vacuum to obtain the purified methyl ester; the weight of the purified ester was 1193 grams.

*Example 9*

Dimethyl dihydronaphthalenedicarboxylate.— About 5 kg. of the crude sodium salts of a mixture of 1,4-dihydronaphthalene-1,4-dicarboxylic and 1,2-dihydronaphthalene-1,2-dicarboxylic acid were mixed with 18.9 liters of methanol. To the mixture, 3.37 kg. of sulfuric acid were added slowly with agitation, while maintaining the temperature below 45° C. The mixture then was refluxed for three hours, after which the reaction mixture was cooled. Sufficient water was added to dissolve the salts, and the crude esterification product was recovered by extracting with trichlorethylene, and distilling off the extraction solvent. The crude ester then was purified by vacuum distillation. The yield was 2.1 kg. of purified ester, which boiled at 135° to 210° C. at a pressure of about 3 mm.

Dimethyl 1,4-dihydronaphthalene-1,4-dicarboxylate isolated from the above ester mixture melted at approximately 81.5 to 83° C. This ester is insoluble in water, but very soluble in methanol, ethanol, benzene ($C_6H_6$) and trichloroethylene. On saponification with sodium hydroxide solution it gives methanol and 1,4-dihydronaphthalene-1,4-dicarboxylic acid melting in the neighborhood of 200° C. The dimethyl ester of 1,2-dihydronaphthalene-1,2-dicarboxylic acid is likewise soluble in methanol, ethanol, benzene ($C_6H_6$) and trichloroethylene, and insoluble in water. On saponification with sodium hydroxide solution it gives methanol and 1,2-dihydronaphthalene-1,2-dicarboxylic acid.

*Example 10*

Didodecyl dihydronaphthalenedicarboxylate.— The dimethyl ester of the mixture of acids disclosed in Example 1 (470 g.), together with 745 g. of dodecyl alcohol, 500 g. of toluol, and 10 g. of litharge was heated to boiling under a fractionating column until the theoretical amount of methyl alcohol in the form of the methyl alcohol-toluene binary had been removed or until the temperature at the top of the column was steady at 110° C., the boiling point of toluene. The mixture was then filtered, heated to 150° C. at 50 mm. to remove toluene, and finally steamed at 150° C. and 50 mm. to remove the last traces of uncombined dodecyl alcohol. The resulting liquid was then treated with decolorizing carbon and then filtered. The product thus obtained was an oily substantially water white liquid of very low volatility.

The esters prepared as described in the above examples vary in physical properties from substantially colorless oily liquids to very viscous liquids which probably could be induced to crystallize. They are extremely high boiling and are of correspondingly low volatility and are quite compatible with cellulose derivatives. The esters are readily soluble in all of the common organic solvents and are miscible with other materials commonly used as plasticizers. They are likewise compatible with various natural and synthetic resins such as polyvinyl acetate, polymerized methyl methacrylate, polyhydric alcohol-polybasic acid resins, phenol-aldehyde resins, modified phenol-aldehyde resins of the Amberol, Beckacite, etc. type, ether resins, and many natural resins such as damar, elemi, shellac, etc. It is to be noted that these resins as well as the cellulose derivatives with which the esters are compatible are highly polymeric materials containing a plurality of C—O—C linkages. It may well be that it is because of this fact that the esters are compatible with these materials.

Monohydric alcohols other than those mentioned above may be used. Monohydric alcohols in general may be employed. Thus, aliphatic alcohols from methyl to octadecyl including the branch chain primary and secondary alcohols obtained as by-products in the synthesis of methanol from carbon monoxide and hydrogen, aromatic alcohols such as benzyl alcohol, alicyclic alcohols such as cyclohexanol, substituted cyclohexanol, and cyclohexyl substituted aliphatic alcohols, ether alcohols such as tetrahydrofurfuryl and the mono-alkyl ethers of ethylene, propylene, and diethylene glycols, etc., dialkyl ethers of glycerol and monohydric ethers of higher alcohols such as the triethyl ether of pentaerythritol, and ester alcohols such as glycol monoacetate, methoxyethyl glycollate, methyl glycollate, etc.

Mixed esters are also included within the scope of the present invention. These may be made in various ways, e. g., by esterifying the acid methyl ester with another alcohol, such as methoxyethanol or by reacting the neutral ester of a volatile alcohol with an equimolecular proportion of a less volatile alcohol, e. g., dimethyl-dihydronaphthalenedicarboxylate 1 mol. with methoxyethanol 1 mol. The mixed esters may thus include the methyl benzyl, the methyl octadecyl, the methyl dihydrofurfuryl, the methyl cyclohexyl, which esters are given, not only as species, but as representative of various classes of mixed esters.

In the preparation of the esters certain catalysts and certain conditions have been mentioned. It is to be understood that other esterification catalysts, particularly acidic catalysts, may be employed. Thus, toluenesulfonic, benzenesulfonic, or other aryl sulfonic acids, phosphoric acid, and perchloric acid may replace the sulfuric acid, for example, of Example 2. Hydrogen chloride may be passed thru the mixture of alcohol and acid. While the examples disclose heating of the acids at certain temperatures, a wide variation in temperature may be employed. In heating the mixture of alcohol and acid time is economized, altho some reaction will take place when the alcohol and the acid are allowed to stand in the presence of a catalyst. The ethylene dichloride disclosed in the examples may be replaced by other inert diluents, such as benzene, toluene, xylene, carbon tetrachloride, and the like. In ester interchange reactions such as exemplified by Example 10, sodium hydroxide, calcium oxide, barium oxide or litharge, or other preferable mildly alkaline ester interchange catalysts may be used.

The method for the preparation of the esters of the present invention is, as we have seen above, capable of considerable variation, and the process of the invention is not limited to the specific methods of preparation disclosed.

The esters prepared by the methods above disclosed and esters of other dihydronaphthalenedicarboxylic acids may be used in the preparation of all types of compositions containing cellulose derivatives, natural and synthetic resins, and/or drying oils. The cellulose derivative compositions are of particular utility in the preparation of lacquers and varnishes for coating metal and wood, dopes for coating fabrics, moistureproof lacquers for coating regenerated cellulose, plastic compositions for use in the preparation of toilet ware, novelties, sheeting, rods, tubes, safety glass interlayers, etc. in lacquers for coating wire screen and cables, and in the preparation of thin transparent sheets useful inter alia for wrapping purposes.

The esters are extremely high boiling, water resistant plasticizers of high compatibility with cellulose derivatives, natural and synthetic resins and oils, and give permanently flexible products of good durability.

The utilization of the esters of the present invention in organic plastic compositions is disclosed and claimed in my copending application Serial No. 742,842, filed September 13, 1934.

The above description and examples are intended to be illustrative only. Any modification of or variation therefrom which conforms to the spirit of the invention is intended to be included within the scope of the claims.

I claim:

1. Process for the preparation of methyl esters of dihydronaphthalenedicarboxylic acids containing a hydrogen atom and a carboxyl group on each of two carbon atoms, which comprises heating approximately 2680 g. of a mixture of 1,4-dihydronaphthalenedicarboxylic acid and 1,2-dihydronaphthalenedicarboxylic acid with approximately 2 liters of methanol in the presence of approximately 60 g. of hydrogen chloride for approximately 7 hours, separating the product by vacuum distillation and isolating the fraction distilling at 115° to 195° C. at 2 to 5 mm. pressure.

2. Process for the preparation of methyl esters of dihydronaphthalenedicarboxylic acids containing a hydrogen atom and a carboxyl group on each of two carbon atoms, which comprises heating a mixture of 1,4-dihydronaphthalenedicarboxylic acid and 1,2-dihydronaphthalenedicarboxylic acid with methanol in the presence of an esterification catalyst.

3. Process for the preparation of esters of dihydronaphthalenedicarboxylic acids containing a hydrogen atom and a carboxyl group on each of two carbon atoms, which comprises heating said acid with a monohydric alcohol in the presence of an esterification catalyst.

4. An ester of a monohydric alcohol with a dihydronaphthalenedicarboxylic acid, said acid having a hydrogen atom and a carboxyl group on each of two carbon atoms.

5. A monohydric alcohol ester of 1,4-dihydronaphthalene-1,4-dicarboxylic acid.

6. A methyl ester of 1,4-dihydronaphthalene-1,4-dicarboxylic acid.

7. Dimethyl 1,4-dihydronaphthalene-1,4-dicarboxylate.

8. A monohydric alcohol ester of 1,2-dihydronaphthalene-1,2-dicarboxylic acid.

9. A methyl ester of 1,2-dihydronaphthalene-1,2-dicarboxylic acid.

10. Dimethyl 1,2-dihydronaphthalene-1,2-dicarboxylate.

11. An ester of a mixture of dihydronaphthalene-dicarboxylic acids having a hydrogen atom and a carboxyl group on each of two carbon atoms, said mixture comprising essentially 1,4-dihydronaphthalene-1,4-dicarboxylic acid and 1,2-dihydronaphthalene-1,2-dicarboxylic acid.

12. A methyl ester of a mixture of dihydronaphthalene-dicarboxylic acids having a hydrogen atom and a carboxyl group on each of two carbon atoms, said mixture comprising essentially 1,4-dihydronaphthalene-1,4-dicarboxylic acid and 1,2-dihydronaphthalene-1,2-dicarboxylic acid.

13. The dimethyl ester of a mixture of dihydronaphthalene-dicarboxylic acids having a hydrogen atom and a carboxyl group on each of two carbon atoms, said mixture comprising essentially 1,4-dihydronaphthalene-1,4-dicarboxylic acid and 1,2-dihydronaphthalene-1,2-dicarboxylic acid.

NORMAN D. SCOTT.